(12) United States Patent
Noh et al.

(10) Patent No.: US 8,556,770 B1
(45) Date of Patent: Oct. 15, 2013

(54) PLANETARY GEAR TRAIN OF AUTOMATIC TRANSMISSION FOR VEHICLES

(71) Applicant: Hyundai Motor Company, Seoul (KR)

(72) Inventors: Myonghoon Noh, Seongnam-si (KR); Hyu Tae Shim, Hwaseong (KR); Kangsoo Seo, Suwon-si (KR); Jae Chang Kook, Hwaseong-si (KR); Chang Wook Lee, Suwon-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/713,848

(22) Filed: Dec. 13, 2012

(30) Foreign Application Priority Data

Oct. 10, 2012 (KR) .................. 10-2012-0112466

(51) Int. Cl.
*F16H 3/44* (2006.01)
(52) U.S. Cl.
USPC .......................... 475/302; 475/219
(58) Field of Classification Search
USPC .............................. 475/219, 302
See application file for complete search history.

(56) References Cited

U.S. PATENT DOCUMENTS 7,883,440 B2 * 2/2011 Phillips et al. ............. 475/275
8,038,568 B2 * 10/2011 Wittkopp et al. ........... 475/302

* cited by examiner

*Primary Examiner* — Erin D Bishop
(74) *Attorney, Agent, or Firm* — Morgan, Lewis & Bockius LLP

(57) ABSTRACT

A planetary gear train may include a first shaft, a second shaft, a first planetary gear set disposed on the first shaft and including a first planet carrier directly connected to the first shaft, a first ring gear, and a first sun gear, a second planetary gear set disposed on the second shaft and including a second sun gear, a second ring gear, and a second planet carrier, a third planetary gear set disposed on the second shaft and including a third sun gear directly connected to the second shaft, a third ring gear selectively connected to the first sun gear and to the second planet carrier, and a third planet carrier directly connected to the second ring gear and an output gear, three transfer gears interposed between the rotation elements, and five frictional elements selectively interconnecting the rotation elements or selectively connecting the rotation elements to a transmission housing.

6 Claims, 11 Drawing Sheets

FIG.2

|  | B1 | C1 | C2 | C3 | C4 | Gear ratio |
|---|---|---|---|---|---|---|
| 1ST | ● | ● |  |  | ● | 4.473 |
| 2ND | ● |  |  | ● | ● | 3.157 |
| 3RD |  | ● |  | ● | ● | 2.139 |
| 4TH |  |  | ● | ● | ● | 1.647 |
| 5TH |  | ● | ● |  | ● | 1.317 |
| 6TH |  | ● | ● | ● |  | 1.010 |
| 7TH | ● | ● | ● |  |  | 0.846 |
| 8TH | ● |  | ● | ● |  | 0.713 |
| Rev | ● |  | ● |  | ● | -2.074 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2012-0112466 filed on Oct. 10, 2012, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve mountability by reducing a length thereof and reduce fuel consumption by improving power delivery performance.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control. In addition, a step ratio between the neighboring shift-speeds should be controlled to be suitable according to the planetary gear train.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving mountability by shortening a length thereof and reducing fuel consumption by improving power delivery performance as a consequence of achieving eight forward speeds and one reverse speed having excellent operating condition of frictional elements and step ratios by combining three planetary gear sets separately disposed on a first shaft and a second shaft, three externally-meshing gears, and five frictional elements.

A planetary gear train of an automatic transmission for a vehicle according to one or more exemplary embodiments of the present invention may include a first shaft receiving torque of an engine. a second shaft disposed in parallel with the first shaft and selectively receiving a rotation speed of the first shaft as an inverse rotation speed. a first planetary gear set disposed on the first shaft and including as rotation elements a first planet carrier directly connected to the first shaft and always operated as an input element, a first ring gear selectively operated as an output element, and a first sun gear selectively operated as an output element or a fixed element. a second planetary gear set disposed on the second shaft and including as rotation elements a second sun gear receiving the inverse rotation speed from the first ring gear, a second ring gear, and a second planet carrier. a third planetary gear set disposed on the second shaft and including as rotation elements a third sun gear directly connected to the second shaft, a third ring gear selectively connected to the first sun gear so as to selectively receive the inverse rotation speed from the first sun gear and selectively connected to the second planet carrier, and a third planet carrier directly connected to the second ring gear and an output gear. three transfer gears interposed at connecting portions between the rotation elements. five frictional elements selectively interconnecting the rotation elements or selectively connecting the rotation elements to a transmission housing.

Each of the first, second, and third planetary gear sets may be a single pinion planetary gear set.

The three transfer gears may include a first transfer gear including a first transfer drive gear selectively connected to the first shaft and a first transfer driven gear connected to the second shaft. a second transfer gear including a second transfer drive gear connected to the first ring gear and a second transfer driven gear connected to the second sun gear. a third transfer gear including a third transfer drive gear selectively connected to the first sun gear and a third transfer driven gear connected to the third ring gear.

The five frictional elements may include a first clutch disposed between the first shaft and the first transfer gear. a second clutch disposed between the second planet carrier and the third ring gear. a third clutch disposed between the first ring gear and the first transfer gear. a fourth clutch disposed between the first sun gear and the third transfer gear. a first brake disposed between the first sun gear and the transmission housing.

The second clutch is disposed between the second planet carrier and the third transfer gear.

Shift-speeds achieved by operating three frictional elements among the five frictional elements may include a first forward speed achieved by operating the first brake and the first and fourth clutches. a second forward speed achieved by operating the first brake and the third and fourth clutches. a third forward speed achieved by operating the first, third, and fourth clutches. a fourth forward speed achieved by operating the second, third, and fourth clutches. a fifth forward speed achieved by operating the first, second, and fourth clutches. a sixth forward speed achieved by operating the first, second, and third clutches. a seventh forward speed achieved by operating the first brake and the first and second clutches. an eighth forward speed achieved by operating the first brake and the second and third clutches. a reverse speed achieved by operating the first brake and the second and fourth clutches.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to a planetary gear train according to an exemplary embodiment of the present invention.

Figure 1:
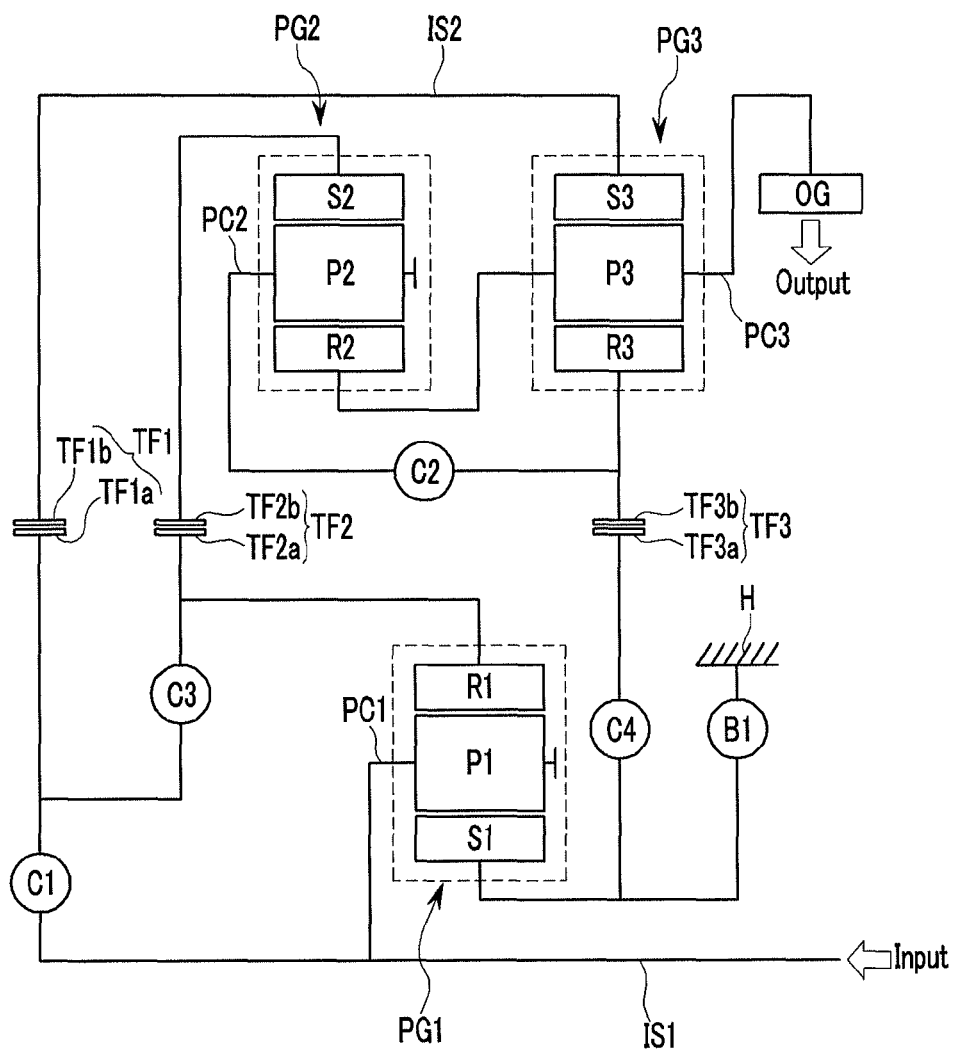
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a planetary gear train according to an exemplary embodiment of the present invention.

Referring to FIG. 1, a planetary gear train according to an exemplary embodiment of the present invention includes first, second, and third planetary gear sets PG1, PG2, and PG3, five frictional elements B1, C1, C2, C3, and C4, and three transfer gears TF1, TF2, and TF3.

The first planetary gear set PG1 is disposed on a first shaft IS1, and the second and third planetary gear sets PG2 and PG3 are disposed on a second shaft IS2 disposed apart from and in parallel with the first shaft IS1.

The first shaft IS1 is an input member and supports the first planetary gear set PG1, and torque transmitted from an engine is transmitted to the first planetary gear set PG1

The second shaft IS2 supports the second and third planetary gear sets PG2 and PG3 and transmits torque selectively transmitted from the first shaft IS1 and the first and second planetary gear sets PG1 and PG2 to the third planetary gear set PG3.

Therefore, torque input from the first shaft IS1 is converted into eight forward speeds and one reverse speed by operations of the first, second, and third planetary gear sets PG1, PG2, and PG3, and is then output through an output gear OG.

The first planetary gear set PG1 is a single pinion planetary gear set, and having a first sun gear S1, a first ring gear R1, and a first planet carrier PC1 rotatably supporting a first pinion P1 engaged with the first sun gear 51 and the first ring gear R1.

The second planetary gear set PG2 is a single pinion planetary gear set, and having a second sun gear S2, a second ring gear R2, and a second planet carrier PC2 rotatably supporting a second pinion P2 engaged with the second sun gear S2 and the second ring gear R2.

The third planetary gear set PG3 is a single pinion planetary gear set, and having a third sun gear S3, a third ring gear R3, and a third planet carrier PC3 rotatably supporting a third pinion P3 engaged with the third sun gear S3 and the third ring gear R3.

The first planet carrier PC1 is directly connected to the first shaft IS1, the second ring gear R2 is directly connected to the third planet carrier PC3, the third sun gear S3 is directly connected to the second shaft IS2, and the third planet carrier PC3 is directly connected to the output gear OG. In addition, the first, second, and third planetary gear sets PG1, PG2, and PG3 are combined by first, second, and third transfer gears TF1, TF2, and TF3 and frictional elements including a first brake B1 and first, second, third, and fourth clutches C1, C2, C3, and C4.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

The first transfer gear TF1 connects the first shaft IS1 with the second shaft IS2.

The second transfer gear TF2 connects the first ring gear R1 with the second sun gear S2.

The third transfer gear TF3 connects the first sun gear S1 with the third ring gear R3.

The first shaft IS1 or rotation elements of the first planetary gear set PG1 and rotation elements of the second planetary gear set PG2 or the third planetary gear set PG3 connected by the first, second, and third transfer gears TF1, TF2, and TF3 are rotated in opposite directions to each other. Gear ratios of the first, second, and third transfer drive gears TF1a, TF2a, and TF3*a* and the first, second, and third transfer driven gears TF1*b*, TF2*b*, and TF3*b* are set according to speed ratios demanded at shift-speeds.

Arrangements of the frictional elements B1, C1, C2, C3, and C4 will be described in detail.

The first brake B1 is disposed between the first sun gear S1 and a transmission housing H.

The first clutch C1 is disposed between the first planet carrier PC1 and the first transfer drive gear TF1*a*.

The second clutch C2 is disposed between the second planet carrier PC2 and the third ring gear R3.

The third clutch C3 is disposed between the first ring gear R1 and the first transfer drive gear TF1*a*.

The fourth clutch C4 is disposed between the first sun gear S1 and the third transfer drive gear TF3*a*.

The frictional elements including the first, second, third, and fourth clutches C1, C2, C3, and C4 and the first brake B1 are conventional multi-plate friction elements of wet type that are operated by hydraulic pressure.

FIG. 2 is an operational chart of friction members at each shift-speed applied to a planetary gear train according to an exemplary embodiment of the present invention.

As shown in FIG. 2, three frictional elements are operated at each shift-speed in the planetary gear train according to an exemplary embodiment of the present invention.

A first forward speed 1ST is achieved by operating the first brake B1 and the first and fourth clutches C1 and C4.

A second forward speed 2ND is achieved by operating the first brake B1 and the third and fourth clutches C3 and C4.

A third forward speed 3RD is achieved by operating the first, third, and fourth clutches C1, C3, and C4.

A fourth forward speed 4TH is achieved by operating the second, third, and fourth clutches C2, C3, and C4.

A fifth forward speed 5TH is achieved by operating the first, second, and fourth clutches C1, C2, and C4.

A sixth forward speed 6TH is achieved by operating the first, second, and third clutches C1, C2, and C3.

A seventh forward speed 7TH is achieved by operating the first brake B1 and the first and second clutches C1 and C2.

An eighth forward speed 8TH is achieved by operating the first brake B1 and the second and third clutches C2 and C3.

A reverse speed REV is achieved by operating the first brake B1 and the second and fourth clutches C2 and C4.

FIG. 3A to FIG. 3I are lever diagrams of the planetary gear train at each shift-speed according to the various exemplary embodiments of the present invention, and illustrate shift processes of the planetary gear train according to the various exemplary embodiments of the present invention by lever analysis method.

Referring to FIG. 3A to FIG. 3I, three vertical lines of the first planetary gear set PG1 are set as the first sun gear S1, the first planet carrier PC1, and the first ring gear R1 from the left to the right, three vertical lines of the second planetary gear set PG2 are set as the second sun gear S2, the second planet carrier PC2, and the second ring gear R2 from the left to the right, and three vertical lines of the third planetary gear set PG3 are set as the third sun gear S3, the third planet carrier PC3, and the third ring gear R3 from the left to the right.

In addition, a middle horizontal line represents a rotation speed of "0", an upper horizontal line represents a rotation speed of "1.0", and a lower horizontal line represents a rotation speed of "−1.0".

"−" means that rotational elements is rotated in an opposite direction of a rotational direction of the engine. It is because the first shaft IS1 and the first planetary gear set PG1 are externally meshed with the second planetary gear set PG2 and the third planetary gear set PG3 through the first, second, and third transfer gears TF1, TF2, and TF3 without an idling gear.

In addition, the rotation speed of "1.0" represents the same rotational speed as the first shaft IS1 which is an input shaft. Distances between the vertical lines of the first, second, and third planetary gear sets PG1, PG2, and PG3 are set according to each gear ratio (teeth number of a sun gear/teeth number of a ring gear).

For example, the gear ratios of the first, second, and third transfer gears TF1, TF2, and TF3 are set as TF1*a*, TF1*b*=1, 0.889, TF2*a*, TF2*b*=1, 1.143, and TF3*a*, TF3*b*=1, 0.333, the gear ratio of the first planetary gear set PG1 is 2.000, the gear ratio of the second planetary gear set PG2 is 3.700, and the gear ratio of the third planetary gear set PG3 is 3.300.

Hereinafter, referring to FIG. 2 and FIG. 3A to FIG. 3I, the shift processes of the planetary gear train according to an exemplary embodiment of the present invention will be described in detail.

[First Forward Speed]

Referring to FIG. 2, the first brake B1 and the first and fourth clutches C1 and C4 are operated at the first forward speed 1ST.

Figure 3A:
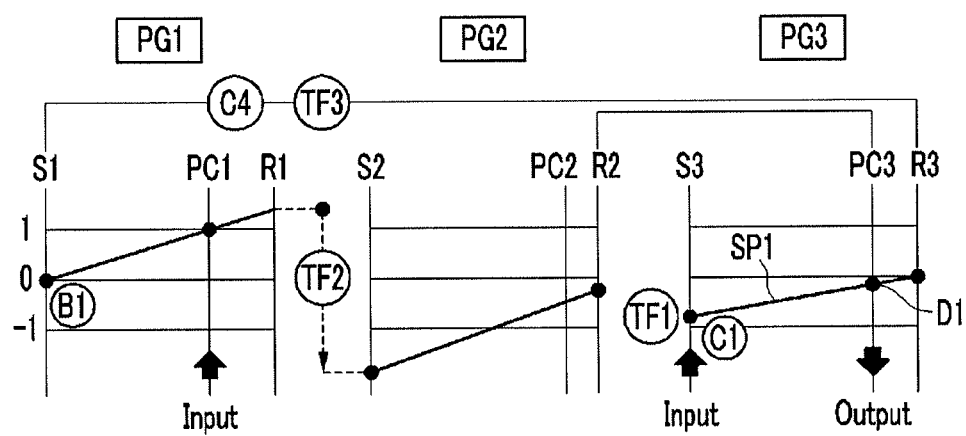
FIG. 3A is a lever diagram of a planetary gear train at the first forward speed according to an exemplary embodiment of the present invention.

As shown in FIG. 3A, the rotation speed of the first shaft IS1 is input to the first planet carrier PC1, and the rotation speed of the first shaft IS1 is reduced according to the gear ratio of the first transfer gear TF1 and is then input to the third sun gear S3 as an inverse rotation speed by operation of the first clutch C1.

At this state, the first sun gear S1 and the third ring gear R3 are operated as fixed elements by operation of the first brake B1 and the fourth clutch C4. Therefore, the rotation elements of the third planetary gear set PG3 form a first shift line SP1 and D1 (a gear ratio is 4.473) is output through the third planet carrier PC3 that is an output element.

At this time, a rotation speed of the first ring gear R1 is increased according to the gear ratio of the second transfer gear TF2 and is then input to the second sun gear S2, but it does not have any effect on shifting.

[Second Forward Speed]

The first clutch C1 that was operated at the first forward speed 1ST is released and the third clutch C3 is operated at the second forward speed 2ND.

Figure 3B:
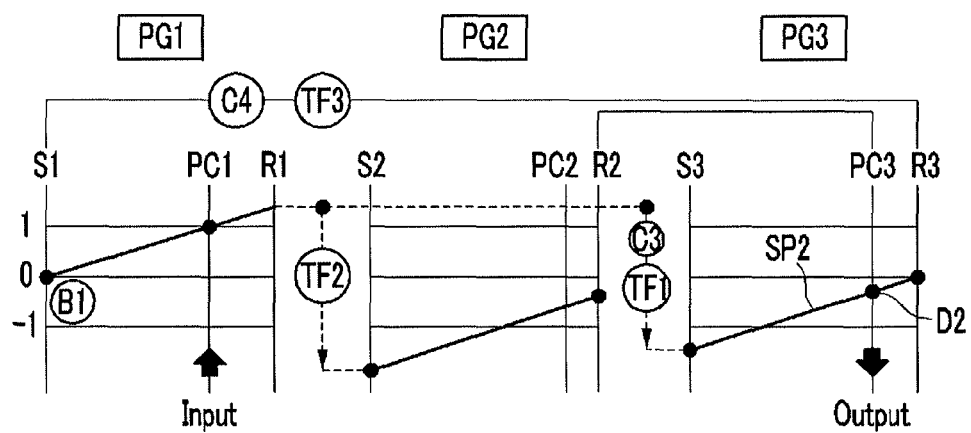
FIG. 3B is a lever diagram of a planetary gear train at the second forward speed according to an exemplary embodiment of the present invention.

As shown in FIG. 3B, the rotation speed of the first shaft IS1 is input to the first planet carrier PC1, and the first sun gear S1 and the third ring gear R3 are operated as fixed elements by operation of the first brake B1 and the fourth clutch C4.

Therefore, a rotation speed output through the first ring gear R1 of the first planetary gear set PG1 is reduced according to the gear ratio of the first transfer gear TF1 and is then input to the third sun gear S3 as an inverse rotation speed by operation of the third clutch C3.

in a state that the inverse rotation speed is input to the third sun gear S1, the third ring gear R3 is operated as a fixed element. Therefore, the rotation elements of the third planetary gear set PG3 form a second shift line SP2 and D2 (a gear ratio is 3.157) is output through the third planet carrier PC3 that is the output element.

At this time, the rotation speed of the first ring gear R1 is increased according to the gear ratio of the second transfer gear TF2 and is then input to the second sun gear S2, but it does not have any effect on shifting.

[Third Forward Speed]

The first brake B1 that was operated at the second forward speed $2^{ND}$ is released and the first clutch C1 is operated at the third forward speed 3RD.

Figure 3C:
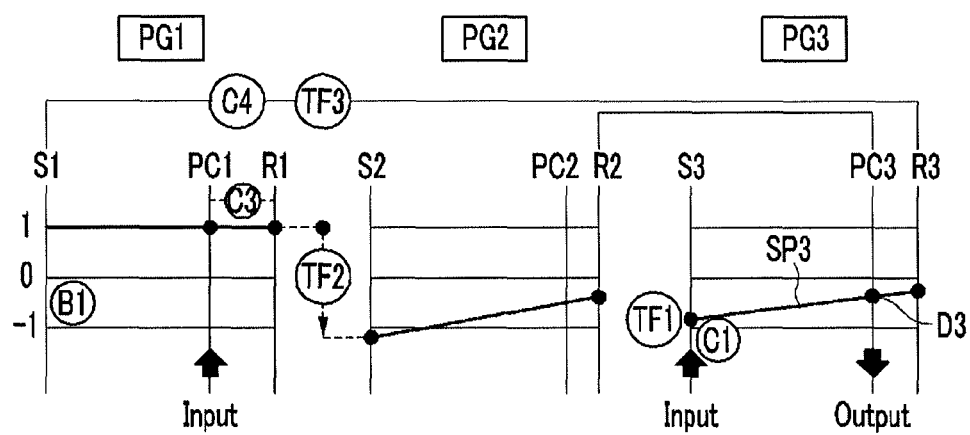
FIG. 3C is a lever diagram of a planetary gear train at the third forward speed according to an exemplary embodiment of the present invention.

As shown in FIG. 3C, in a state that the rotation speed of the first shaft IS1 is input to the first planet carrier PC1, and the first planetary gear set PG1 becomes a direct-coupling state by operation of the first and third clutches C1 and C3.

Therefore, the rotation speed of the first shaft IS1 is reduced and increased respectively according to the gear ratios of the first and second transfer gears TF1 and TF2, and is then input respectively to the third sun gear S3 and the second sun gear S2 as inverse rotation speeds.

In addition, a rotation speed reduced according to the gear ratio of the third transfer gear TF3 is input to the third ring gear R3 as an inverse rotation speed by operation of the fourth clutch C4.

Since different inverse rotation speeds are input to the third sun gear S1 and the third ring gear R3, the rotation elements of the third planetary gear set PG3 form a third shift line SP3 and D3 (a gear ratio is 2.139) is output through the third planet carrier PC3 that is the output element.

At this time, the rotation speed of the first ring gear R1 is increased according to the gear ratio of the second transfer gear TF2 and is then input to the second sun gear S2, but it does not have any effect on shifting.

[Fourth Forward Speed]

The first clutch C1 that was operated at the third forward speed 3RD is released and the second clutch C2 is operated at the fourth forward speed 4TH.

Figure 3D:
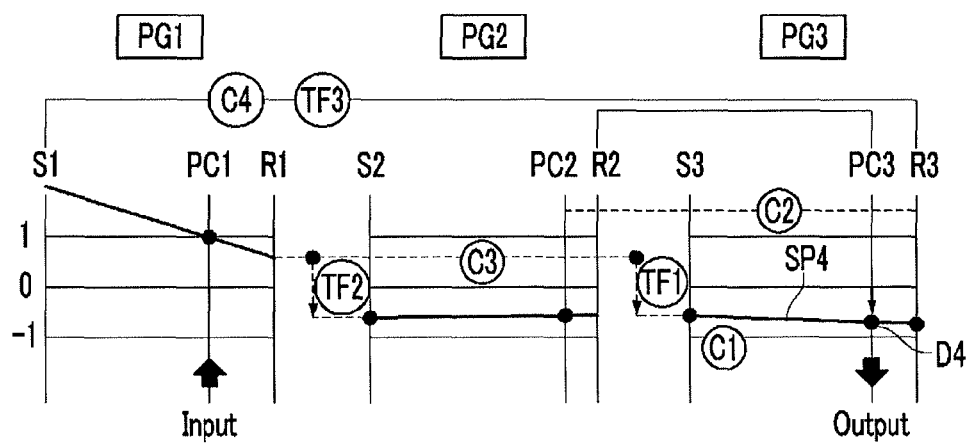
FIG. 3D is a lever diagram of a planetary gear train at the fourth forward speed according to an exemplary embodiment of the present invention.

As shown in FIG. 3D, the rotation speed of the first shaft IS1 is input to the first planet carrier PCI, and the rotation speed of the first ring gear R1 is reduced according to the gear ratio of the first transfer gear TF1 and is then input to the third sun gear S3 as an inverse rotation speed by operation of the third clutch C3.

In addition, the rotation speed of the first sun gear S1 is reduced according to the gear ratio of the third transfer gear TF3 and is then input to the third ring gear R3 as an inverse rotation speed by operation of the fourth clutch C4.

Therefore, the rotation elements of the third planetary gear set PG3 form a fourth shift line SP4 and D4 (a gear ratio is 1.647) is output through the third planet carrier PC3 that is an output element.

[Fifth Forward Speed]

The third clutch C3 that was operated at the fourth forward speed 4TH is released and the first clutch C1 is operated at the fifth forward speed 5TH.

Figure 3E:
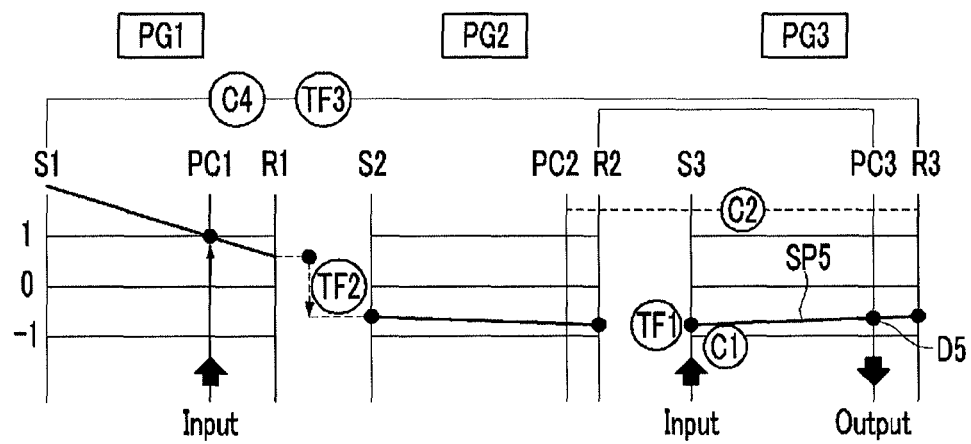
FIG. 3E is a lever diagram of a planetary gear train at the fifth forward speed according to an exemplary embodiment of the present invention.

As shown in FIG. 3E, the rotation speed of the first shaft IS1 is input to the first planet carrier PC1, and the rotation speed of the first shaft IS1 is reduced according to the gear ratio of the first transfer gear TF1 and is then input to the third sun gear S3 as an inverse rotation speed by operation of the first clutch C1.

In addition, the rotation speed of the first ring gear R1 is increased according to the gear ratio of the second transfer gear TF2 and is then input to the second sun gear S2 as an inverse rotation speed, and the rotation speed of the first sun gear S1 is reduced according to the gear ratio of the third transfer gear TF3 and is then input to the third ring gear R3 as an inverse rotation speed by operation of the fourth clutch C4.

Therefore, the rotation elements of the third planetary gear set PG3 form a fifth shift line SP5 and D5 (a gear ratio is 1.317) is output through the third planet carrier PC3 that is the output element.

[Sixth Forward Speed]

The fourth clutch C4 that was operated at the fifth forward speed 5TH is released and the third clutch C3 is operated at the sixth forward speed 6TH.

Figure 3F:
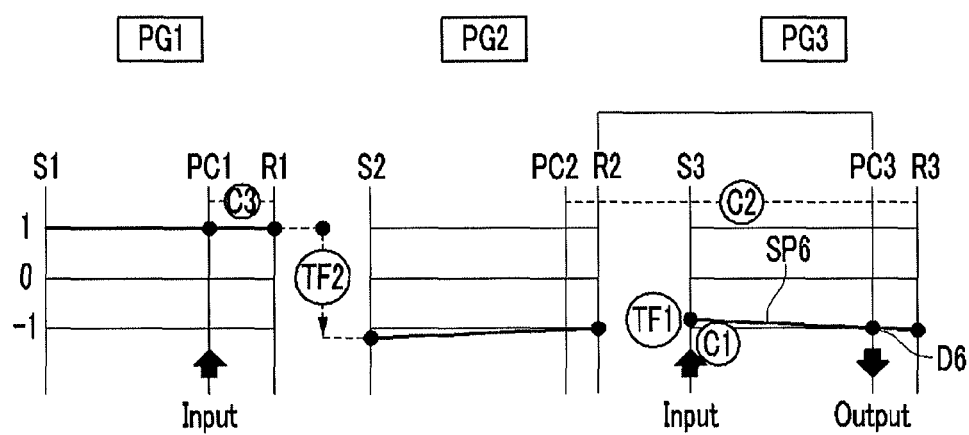
FIG. 3F is a lever diagram of a planetary gear train at the sixth forward speed according to an exemplary embodiment of the present invention.

As shown in FIG. 3F, in a state that the rotation speed of the first shaft IS1 is input to the first planet carrier PCI, the first planetary gear set PG1 becomes the direct-coupling state by operation of the first and third clutches C1 and C3.

Therefore, the rotation speed of the first shaft IS1 is reduced and increased respectively according to the gear ratios of the first and second transfer gears TF1 and TF2 and is then input respectively to the third sun gear S3 and the second sun gear S2 as inverse rotation speeds.

In addition, the second planet carrier PC2 and the third ring gear R3 are connected by operation of the second clutch C2 such that the rotation elements of the third planetary gear set PG3 form a sixth shift line SP6, and D6 (a gear ratio is 1.010) is output through the third planet carrier PC3 that is the output element.

[Seventh Forward Speed]

The third clutch C3 that was operated at the sixth forward speed 6TH is released and the first brake B1 is operated at the seventh forward speed 7TH.

Figure 3G:
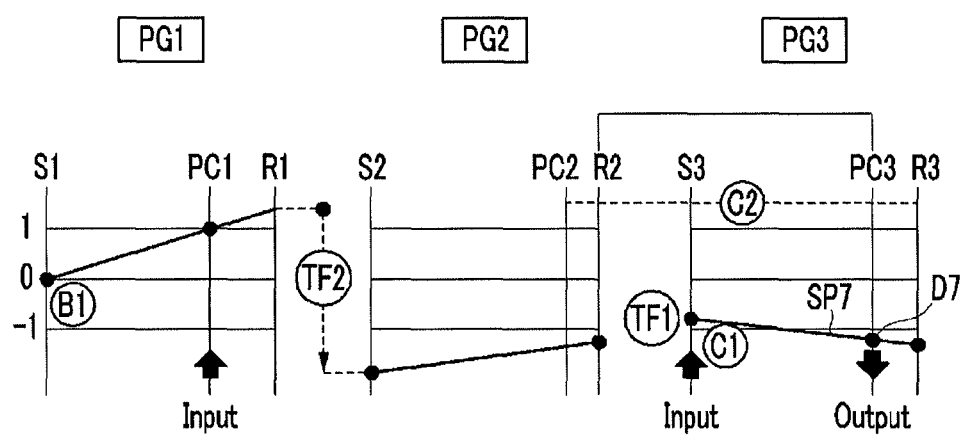
FIG. 3G is a lever diagram of a planetary gear train at the seventh forward speed according to an exemplary embodiment of the present invention.

As shown in FIG. 3G, the rotation speed of the first shaft IS1 is input to the first planet carrier PC1, and the rotation speed of the first shaft IS1 is reduced according to the gear ratio of the first transfer gear TF1 and is then input to the third sun gear S3 as an inverse rotation speed by operation of the first clutch C1.

In addition, the first sun gear S1 is operated as a fixed element by operation of the first brake B1, the rotation speed of the first ring gear R1 is increased according to the gear ratio of the second transfer gear TF2 and is then input to the second sun gear S2 as an inverse rotation speed.

At this state, the second planet carrier PC2 is connected to the third ring gear R3 by operation of the second clutch C2 such that the rotation elements of the third planetary gear set PG3 form a seventh shift line SP7, and D7 (a gear ratio is 0.846) is output through the third planet carrier PC3 that is the output element.

[Eighth Forward Speed]

The first clutch C1 that was operated at the seventh forward speed 7TH is released and the third clutch C3 is operated at the eighth forward speed 8TH.

Figure 3H:
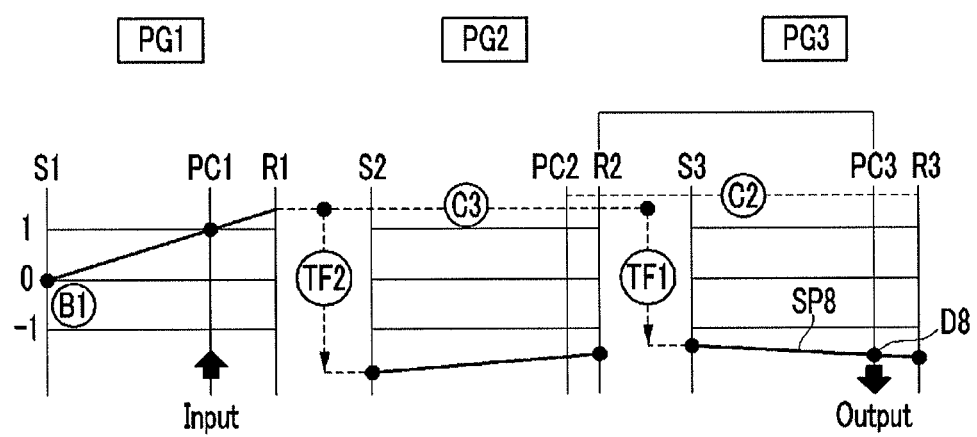
FIG. 3H is a lever diagram of a planetary gear train at the eighth forward speed according to an exemplary embodiment of the present invention.

As shown in FIG. 3H, the rotation speed of the first shaft IS1 is input to the first planet carrier PC1 and the first sun gear S1 is operated as a fixed element by operation of the first brake B1.

Therefore, the rotation speed of the first ring gear R1 of the first planetary gear set PG1 is reduced according to the gear ratio of the first transfer gear TF1 and is then input to the third sun gear S3 as an inverse rotation speed by operation of the third clutch C3, and is increased according to the gear ratio of the second transfer gear TF2 and is then input to the second sun gear S2 as an inverse rotation speed.

At this state, the second planet carrier PC2 is connected to the third ring gear R3 by operation of the second clutch C2 such that the rotation elements of the third planetary gear set PG3 form an eighth shift line SP8, and D8 (a gear ratio is 0.713) is output through the third planet carrier PC3 that is the output element.

[Reverse Speed]

As shown in FIG. 2, the first brake B1 and the second and fourth clutches C2 and C4 are operated at the reverse speed REV.

Figure 3I:
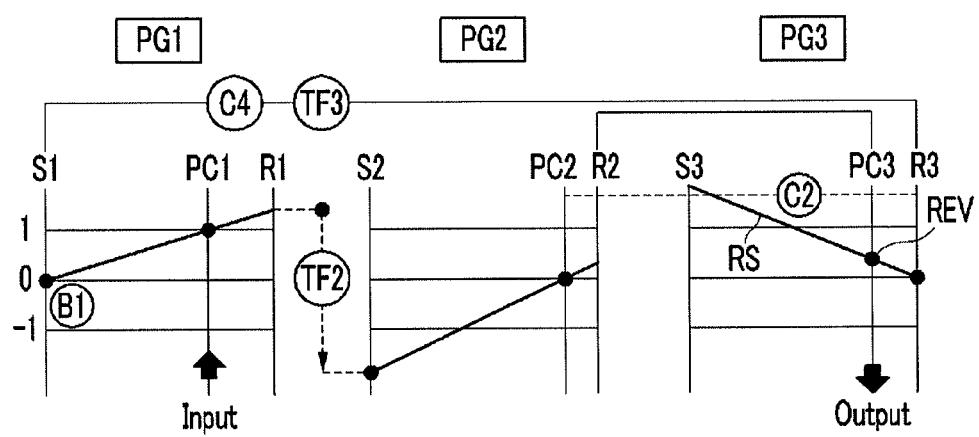
FIG. 3I is a lever diagram of a planetary gear train at a reverse speed according to an exemplary embodiment of the present invention.

As shown in FIG. 3I, the rotation speed of the first shaft IS1 is input to the first planet carrier PC1, and the first sun gear S1, the second planet carrier PC2, and the third ring gear R3 are operated as fixed elements by operation of the first brake B1 and the second and fourth clutches C2 and C4.

In addition, the rotation speed of the first ring gear R1 is increased according to the gear ratio of the second transfer gear TF2 and is then input to the second sun gear S2 as an inverse rotation speed. The rotation elements of the third planetary gear set PG3 form a reverse speed shift line RS and REV (a gear ratio is −2.074) is output through the third planet carrier PC3 that is the output element.

Since three planetary gear sets are separately disposed on the first shaft and the second shaft disposed apart from and in parallel with each other in the planetary gear train according to an exemplary embodiment of the present invention, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance may be improved. Therefore, a start-up clutch instead of a torque converter may be used.

Since three frictional elements are operated at each shift-speed, non-operated frictional element may be minimized and drag torque may be reduced. In addition, fuel consumption may be reduced by increasing power delivery efficiency. In addition, since torque load of each frictional element can be reduced, compact design is possible.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    a first shaft receiving torque of an engine;
    a second shaft disposed in parallel with the first shaft and selectively receiving a rotation speed of the first shaft as a first inverse rotation speed;
    a first planetary gear set disposed on the first shaft and including as rotation elements a first planet carrier, a first ring gear, and a first sun gear, wherein the first planet carrier is directly connected to the first shaft and always operated as an input element, the first ring gear is selectively operated as an output element, and the first sun gear is selectively operated as an output element or a fixed element;
    a second planetary gear set disposed on the second shaft and including as rotation elements a second sun gear, a second ring gear, and a second planet carrier, wherein the second sun gear receives a second inverse rotation speed from the first ring gear;
    a third planetary gear set disposed on the second shaft and including as rotation elements a third sun gear, a third ring gear, and a third planet carrier, wherein the third sun gear is directly connected to the second shaft, the third ring gear is selectively connected to the first sun gear so as to selectively receive a third inverse rotation speed from the first sun gear, the third ring gear is selectively connected to the second planet carrier, and the third planet carrier is directly connected to the second ring gear and an output gear;
    three transfer gears interposed at connecting portions between the rotation elements, wherein a third transfer gear of the three transfer gears includes a third transfer drive gear selectively directly connected to the first sun gear and a third transfer driven gear connected to the third ring gear; and
    five frictional elements each selectively interconnecting one of the rotation elements of the first, second, and third planetary gear sets with another of the rotation elements of the first, second, and third planetary gear sets, or selectively connecting one of the rotation elements of the first, second, and third planetary gear sets to a transmission housing.

2. The planetary gear train of claim 1, wherein each of the first, second, and third planetary gear sets is a single pinion planetary gear set.

3. The planetary gear train of claim 1, wherein the three transfer gears further include:
    a first transfer gear including a first transfer drive gear selectively connected to the first shaft and a first transfer driven gear connected to the second shaft; and
    a second transfer gear including a second transfer drive gear connected to the first ring gear and a second transfer driven gear connected to the second sun gear.

4. The planetary gear train of claim 3, wherein the five frictional elements include:
    a first clutch disposed between the first shaft and the first transfer gear;
    a second clutch disposed between the second planet carrier and the third ring gear;
    a third clutch disposed between the first ring gear and the first transfer gear;
    a fourth clutch disposed between the first sun gear and the third transfer gear; and
    a first brake disposed between the first sun gear and the transmission housing.

5. The planetary gear train of claim 4, wherein the second clutch is disposed between the second planet carrier and the third transfer gear.

6. The planetary gear train of claim 4, wherein a plurality of shift-speeds each achieved by operating three frictional elements among the five frictional elements include:
    a first forward speed achieved by operating the first brake and the first and fourth clutches;
    a second forward speed achieved by operating the first brake and the third and fourth clutches;
    a third forward speed achieved by operating the first, third, and fourth clutches;
    a fourth forward speed achieved by operating the second, third, and fourth clutches;
    a fifth forward speed achieved by operating the first, second, and fourth clutches;
    a sixth forward speed achieved by operating the first, second, and third clutches;
    a seventh forward speed achieved by operating the first brake and the first and second clutches;
    an eighth forward speed achieved by operating the first brake and the second and third clutches; and
    a reverse speed achieved by operating the first brake and the second and fourth clutches.

* * * * *